(12) United States Patent
Chen et al.

(10) Patent No.: US 8,206,019 B2
(45) Date of Patent: Jun. 26, 2012

(54) ADVANCED CONNECTOR ASSEMBLY

(75) Inventors: Chen-Jung Chen, Taoyuan Hsien (TW);
Yong-Gang Wang, Taoyuan Hsien (TW); Chih-Tse Chen, Taoyuan Hsien (TW); Yi-Bin Lee, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 295 days.

(21) Appl. No.: 12/748,972

(22) Filed: Mar. 29, 2010

(65) Prior Publication Data
US 2010/0182798 A1 Jul. 22, 2010

Related U.S. Application Data

(63) Continuation-in-part of application No. 12/199,280, filed on Aug. 27, 2008, now Pat. No. 7,712,941.

(30) Foreign Application Priority Data

Nov. 16, 2007 (TW) .............................. 96143392 A

(51) Int. Cl.
*F21V 33/00* (2006.01)

(52) U.S. Cl. ................... 362/581; 439/490; 439/620.13
(58) Field of Classification Search .................. 362/561, 362/581; 439/676, 488, 490, 607.01, 607.23, 439/620.13
See application file for complete search history.

(56) References Cited

U.S. PATENT DOCUMENTS

| | | | |
|---|---|---|---|
| 5,876,239 A * | 3/1999 | Morin et al. ................... 439/490 |
| 7,712,941 B2 * | 5/2010 | Tai et al. ......................... 362/581 |
| 2001/0000767 A1 * | 5/2001 | Ezawa et al. ................... 439/490 |
| 2007/0155223 A1 * | 7/2007 | Huang et al. ................... 439/490 |

* cited by examiner

*Primary Examiner* — Laura Tso
(74) *Attorney, Agent, or Firm* — Muncy, Geissler, Olds & Lowe, PLLC

(57) ABSTRACT

A connector assembly is provided. The connector assembly includes a housing having at least a socket, an electronic device disposed in the housing, a protection member disposed on a side of the housing, a light emitting element disposed on the protection member, a light pipe disposed on the housing for guiding light from the light emitting element, a shield surrounding the protection member and the light emitting element, and a cover encompassing the light pipe, the shield, and the light emitting element.

19 Claims, 10 Drawing Sheets

ADVANCED CONNECTOR ASSEMBLY

CROSS REFERENCE TO RELATED APPLICATIONS

The present invention is a continuation-in-part (C.I.P.) application of U.S. patent application Ser. No. 12/199,280 filed on Aug. 27, 2008 now U.S. Pat. No. 7,712,941, which is entitled "Connector Assembly", and claims priority under 35 U.S.C. §119(a) on Patent Application No. 096143392 filed in Taiwan, Republic of China on Nov. 16, 2007, the entire contents of which are hereby incorporated by reference.

BACKGROUND OF THE INVENTION

1. Field of the Invention

The invention relates to a connector assembly and in particular to an advanced connector assembly having light emitting elements and light pipes.

2. Description of the Related Art

The conventional connector usually includes several interior components such as chokes, filters, resisters, capacitors, transformers, and light-emitting diodes (LEDs) for providing specific functions. The interior components are assembled and arranged according to electronic specifications and functional requirements, wherein at least one printed circuit board (PCB) can be provided for electrical connection between the interior components. However, the PCB not only occupy considerable space, but also generate electromagnetic interference (EMI), which interferes with signal transmission.

The conventional connectors may use LEDs as light emitting elements showing operation states thereof. As shown in FIG. 1, an LED 11 is positioned in a rear part of a connector 1. Since the LED 11 is disposed inside the connector 1, EMI and noise may occur between the LED 11 and other interior components, such as chokes or transformers, adversely affecting reliability and efficiency thereof. As transmission speed of the connectors increase, for example, from 10 Mbps to as fast as 1 Gbps, EMI issues also increase and can become a very serious problem.

BRIEF SUMMARY OF INVENTION

To eliminate the disadvantages of the conventional connectors, the present invention provides an advanced connector assembly including light emitting elements and light pipes. A shield having barrel-like shaped structures prevents light scattering and EMI from the light emitting elements so that the reliability of the connector assembly is improved. Furthermore, the light leakage between the adjacent light pipes can be prevented.

An embodiment of the present invention provides a connector assembly including a housing having at least a socket, an electronic device disposed in the housing, a protection member disposed on a side of the housing, a light emitting element disposed on the protection member, a light pipe disposed on the housing for guiding light from the light emitting element, a shield surrounding the protection member and the light emitting element, and a cover encompassing the light pipe, the shield, and the light emitting element.

In one embodiment of the present invention, the housing includes a first casing and a second casing connected to each other by engaging, adhering or fastening. The electronic device includes a circuit board horizontally disposed between the first and second casings. However, the housing can also be integrally formed as a monolithic piece by injection molding.

In one embodiment of the present invention, the housing has a channel on a top inner surface thereof, and the light pipe has an extended portion inserted through the channel and exposed to a lateral surface of the housing. The light emitting element can be an LED.

In one embodiment of the present invention, the cover comprises a front member and a rear member connected to each other, wherein the front member has a plurality of legs connected to ground. The front and rear members are connected to each other by engaging, adhering or fastening. The shield contacts the rear member.

In one embodiment of the present invention, the cover includes metal and is integrally formed as a monolithic piece by stamping. The housing includes a plurality of recesses, and the electronic device comprises a plurality of pins received in the recesses and electrically connected to an external plug. The electronic device may include a transformer, a capacitor, or other electronic components.

In one embodiment of the present invention, the housing includes a hole, and the light pipe has at least a hook engaged with in the hole for positioning of the light pipe. The light pipe may include plastic, glass or acrylics.

In one embodiment of the present invention, the protection member includes a first engaging member, and the shield includes a second engaging member engaged with the first engaging member. The protection member may include plastic or electrical insulating material, and the shield may include metal. Specifically, the shield includes at least a partition for dividing the shield into a plurality of cavities for allowing the light emitting element to be inserted therein. The partition is barrel-like shaped by cutting the shield and then bending inwardly.

In one embodiment of the present invention, the connector assembly, such as an RJ-45 connector, further includes a main circuit board disposed at the bottom of the housing, and the light emitting element comprises a plurality of terminals electrically connected to the main circuit board.

The present invention further provides a connector assembly including a housing having a plurality of sockets, an electronic device disposed in the housing, a protection member disposed on a side of the housing, a plurality of light emitting elements disposed on the protection member, a plurality of light pipes disposed on the housing for guiding light from the light emitting element, a shield surrounding the protection member and the light emitting element, and a cover encompassing the light pipes, the shield, and the light emitting elements, wherein the sockets are arranged in two rows aligned with each other.

The present invention further provides a connector assembly including a housing having a plurality of sockets and a plurality of spacers for dividing the sockets, an electronic device disposed in the housing, a protection member disposed on a side of the housing, a plurality of light emitting elements disposed on the protection member, a plurality of light pipe pairs disposed on the housing for guiding light from the light emitting elements, respectively, a shield surrounding the protection member and the light emitting element, and a cover encompassing the light pipes, the shield, and the light emitting elements, wherein the sockets are arranged in two rows aligned with each other.

Preferably, the housing is formed as a monolithic piece, two light emitting elements and the light pipe pair corresponding thereto are disposed between the two adjacent spacers, two sub units of the light pipe pair are aligned with each other, each of the sub units of the light pipe pair has a hook engaged with in the hole of the housing for positioning of the light pipe pair, and the bottom of the light pipe pair abuts the light emitting elements and has elongate parts disposed between two adjacent light emitting elements so that the light leakage therebetween can be prevented.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given herein below and the accompanying drawings which are given by way of illustration only, and thus are not limitative of the present invention, and wherein.

DETAILED DESCRIPTION OF INVENTION

Figure 1:
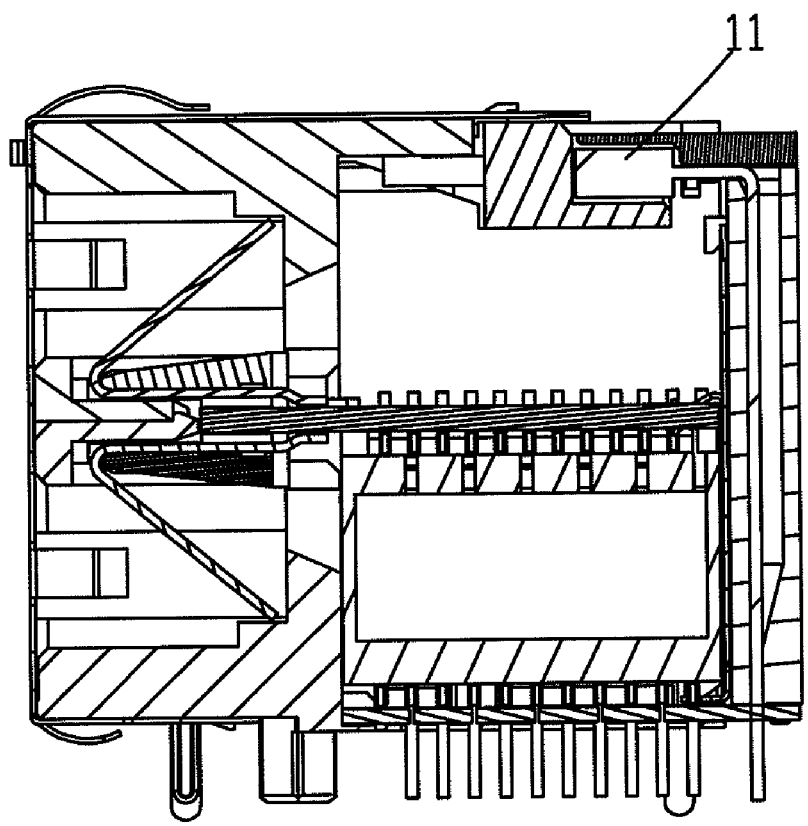
FIG. 1 is a cross-sectional view of a conventional connector.
Figure 2A:
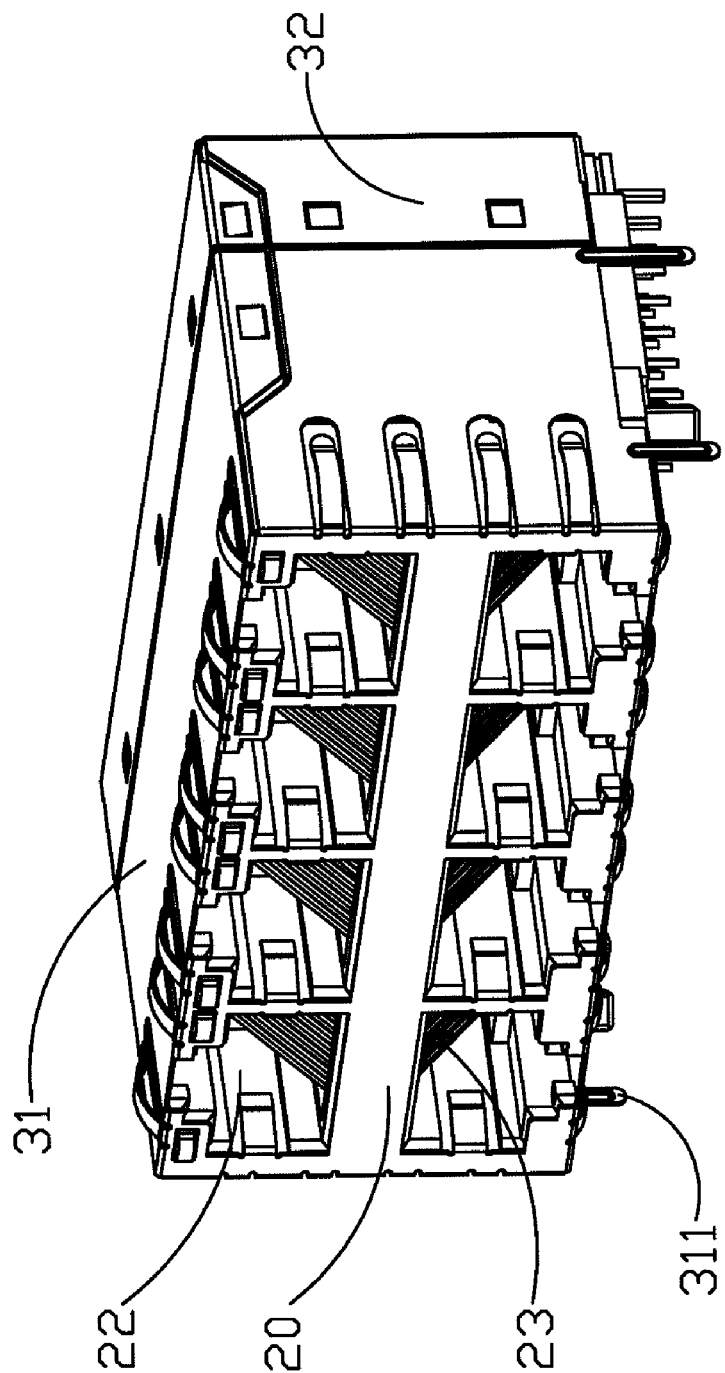
FIG. 2A is a perspective diagram of an embodiment of a connector assembly according to the present invention.
Figure 2B:
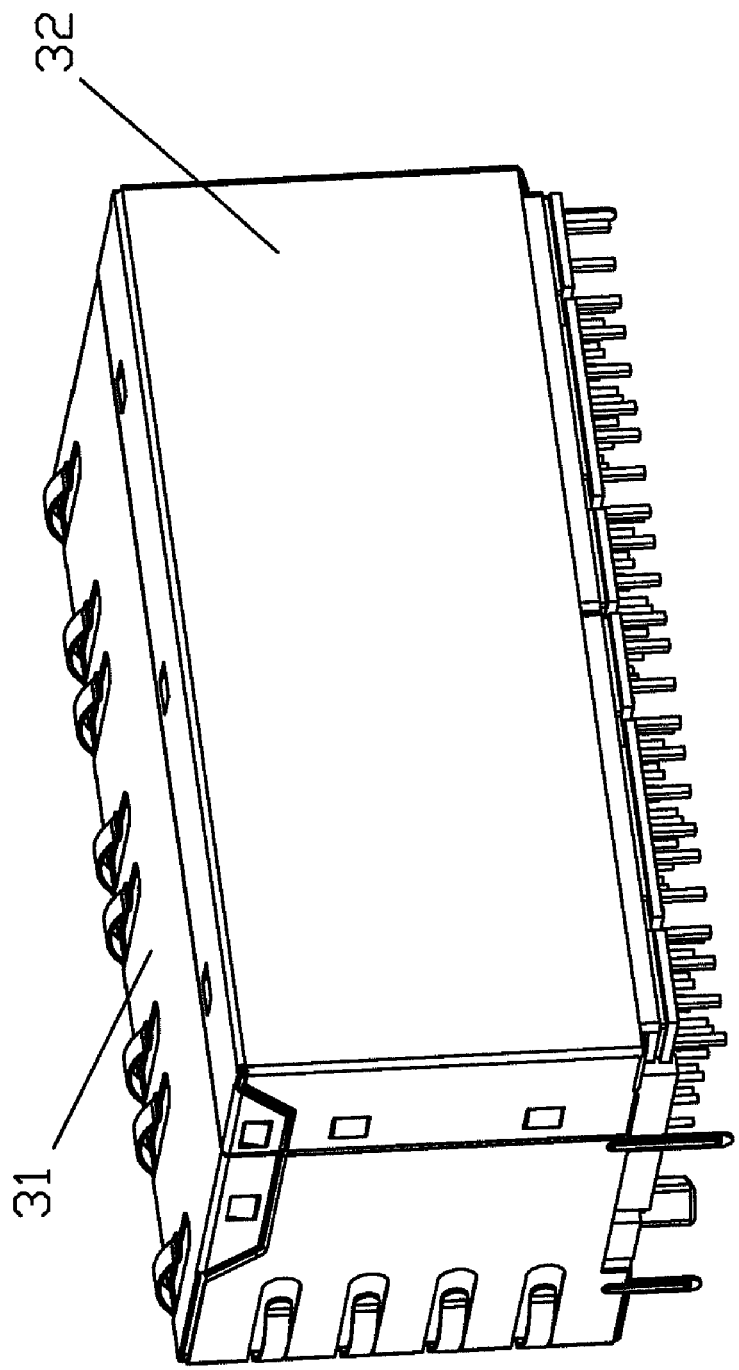
FIG. 2B is another perspective diagram of the connector assembly shown in FIG. 2A.
Figure 2C:
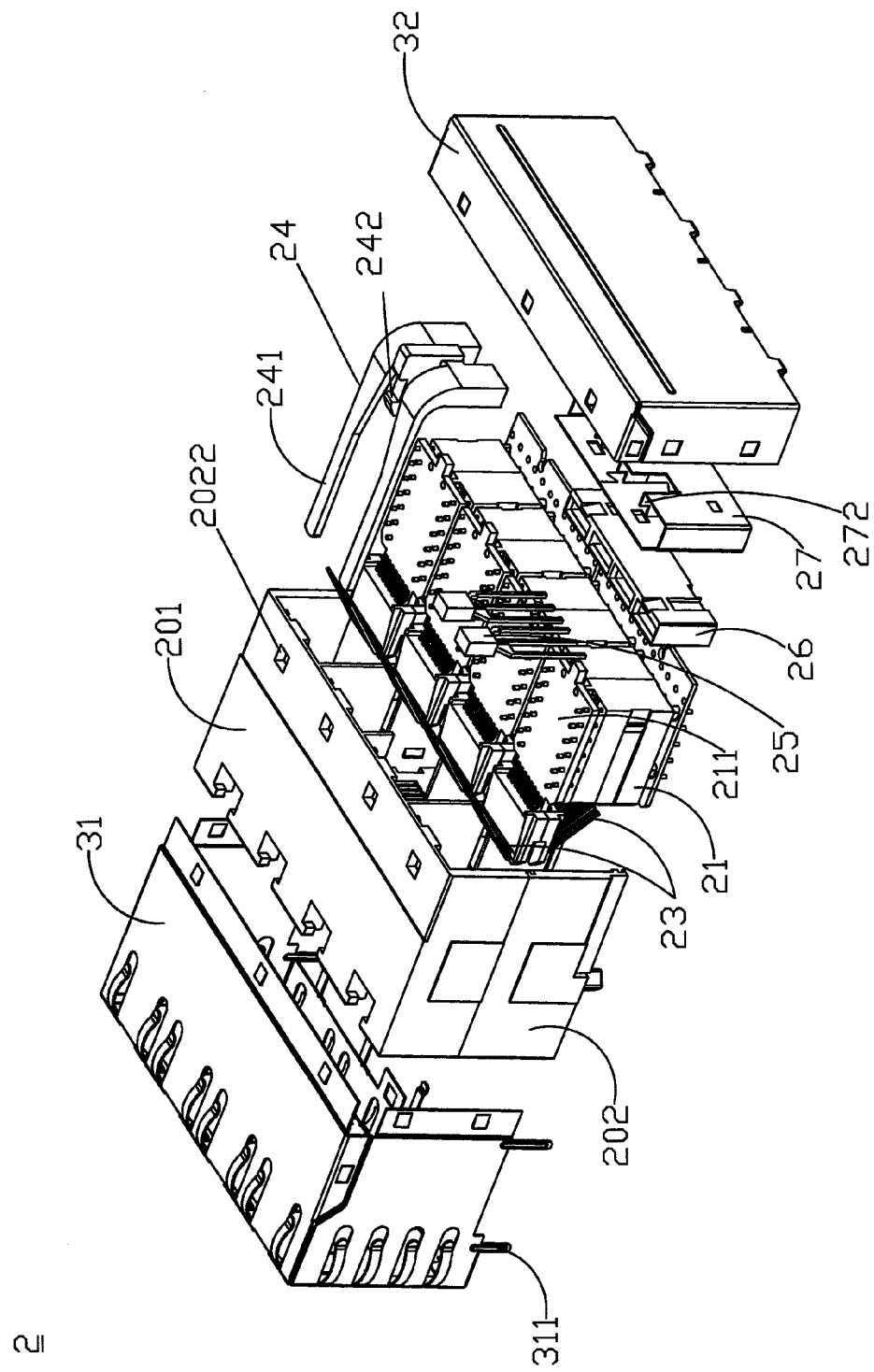
FIG. 2C is an exploded diagram of the connector assembly shown in FIG. 2A.

Referring to FIGS. 2A-2D, an embodiment of a connector assembly 2 according to the present invention, such as an RJ-45 connector, includes a housing 20, an electronic device 21, and a cover. As shown in FIG. 2C, the housing 20 includes a first casing 201 and a second casing 202. The first and second casings 201, 202 can be connected to each other by engaging, adhering or fastening. Furthermore, the first and second casings 201, 202 can be integrally formed as a monolithic piece by injection molding. As shown in FIG. 2A, the housing 20 forms two rows of sockets 22 aligned with each other.

The electronic device 21 is disposed in the housing 20 and includes a plurality of pins 23 received in a plurality of recesses of the housing 20, correspondingly. When inserting an external plug into the sockets 22, the external plug electrically connects to the pins 23.

The electronic device 21 further includes a plurality of circuit boards 211 horizontally disposed between the first and second casings 201, 202. The housing 20 is encompassed by the cover, which includes a front member 31 and a rear member 32, wherein the front and rear members 31, 32 can be connected to each other by engaging, adhering or fastening.

The front member 31 has a plurality of legs 311 connected to ground. In this embodiment, the front and rear members 31, 32 can be metal and integrally formed as a monolithic piece by stamping. The electronic device 21 may include a transformer, a capacitor, or other electronic components.

Figure 2D:
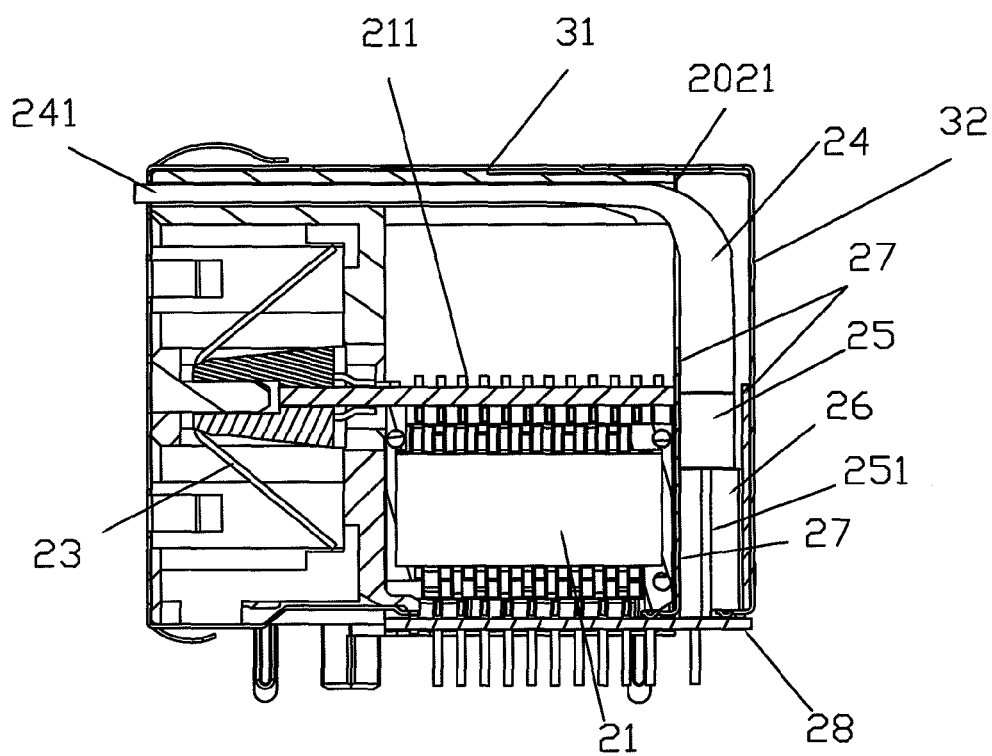
FIG. 2D is a cross-sectional view of the connector assembly shown in FIG. 2A.

Referring to FIGS. 2C and 2D, the connector assembly 2 further includes at least a light pipe 24 and a light emitting element 25, and the housing 20 includes a plurality of channels 2021. Two parallel extended portions 241 of the light pipe 24 are inserted through the channels 2021 and exposed to the front side of the housing 20. As shown in FIG. 2D, the bottom of the light pipe 24 abuts the light emitting element 25 so that light from the light emitting element 25 is guided to a front side of the housing 20 for showing the operational state of the connector assembly 2. As shown in FIG. 2C, at least a hook 242 is formed between the two adjacent extended portions 241 and engaged with the corresponding hole 2022 of the housing 20 so that the light pipes 24 can be fixed to the housing 20. The light emitting element 25 can be an LED, and the light pipe 24 can be plastic, glass or acrylics. In some embodiments, the light pipe 24 can be dovetail shaped.

Figure 3:
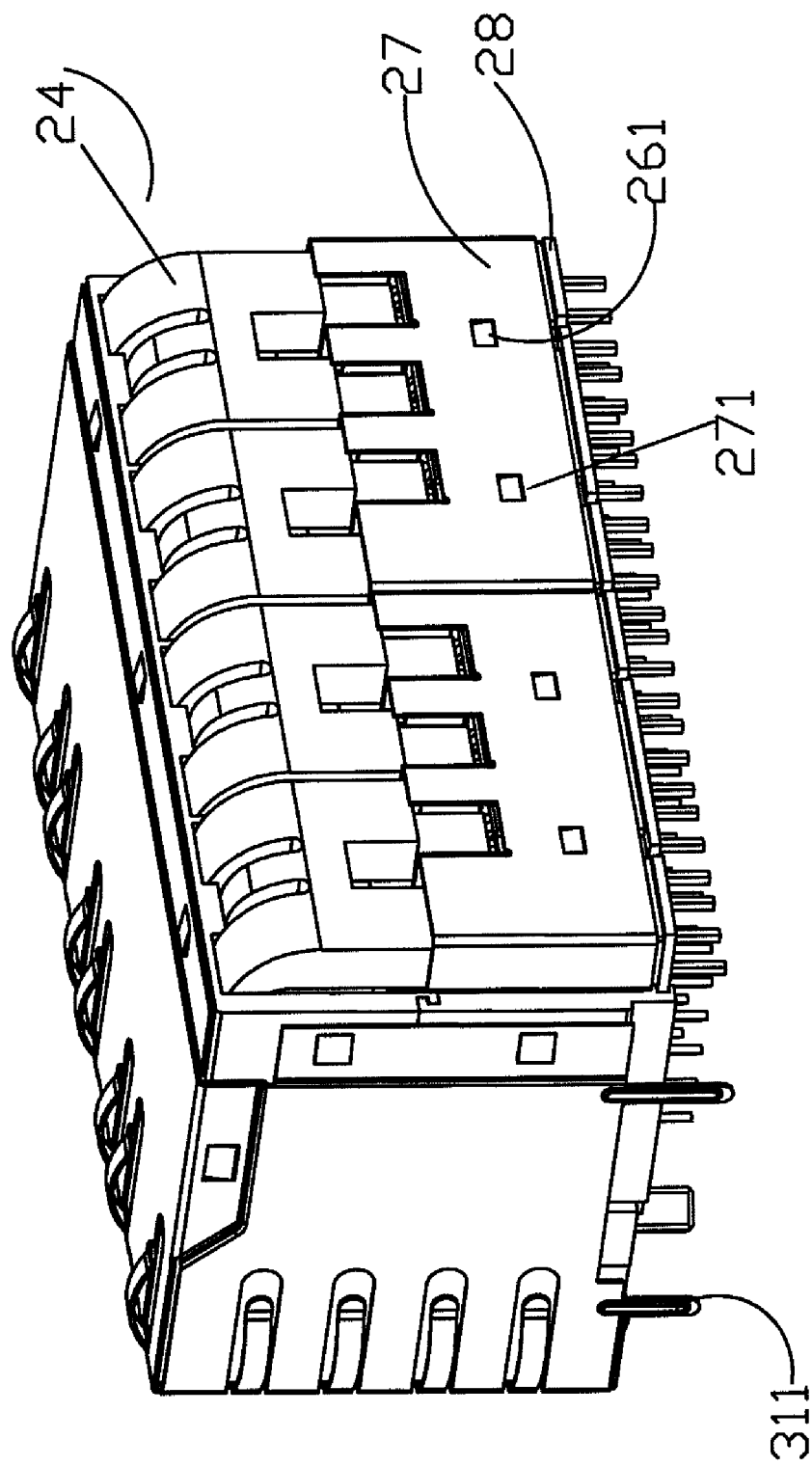
FIG. 3 is a perspective diagram of the connector assembly shown in FIG. 2A without the rear member.
Figure 4:
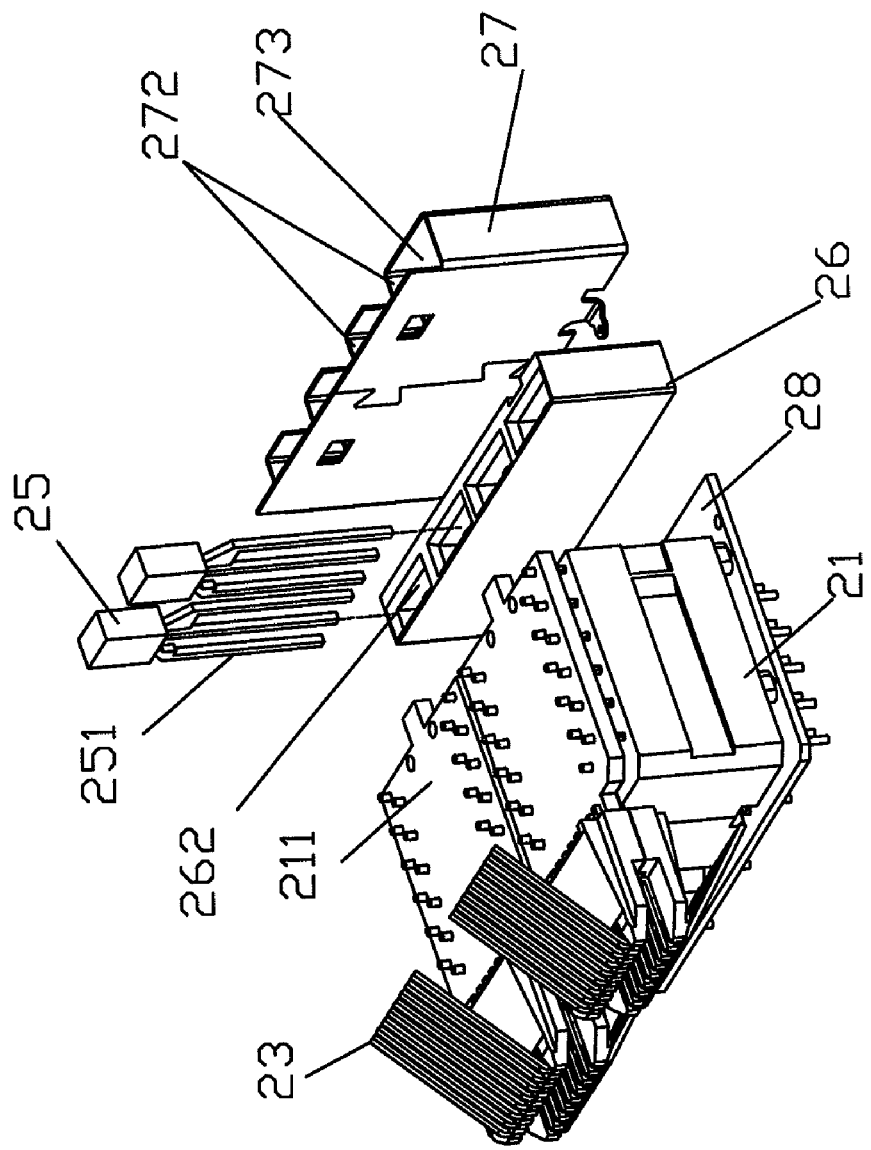
FIG. 4 is an exploded diagram of parts of the connector assembly shown in FIG. 2A.

Referring to FIGS. 3 and 4, the light emitting element 25 is received in a slot 262 of a protection member 26, wherein the light emitting element 25 and the protection member 26 are encompassed by a shield 27. As shown in FIG. 3, the protection member 26 has a first engaging member 261, and correspondingly, the shield 27 has a second engaging member 271 engaged with the first engaging member 261. The protection member 26 can be plastic or electrical insulating material, and the shield 27 can be metal. In FIG. 4, the shield 27 includes a plurality of partitions 272 for dividing the shield 27 into several cavities 273 for allowing the light emitting elements 25 to be inserted therethrough, respectively. Here, the partitions 272 are barrel-like shaped by cutting the shield 27 and then bending the shield 27 inwardly.

During assembling, the protection member 26 is connected to the shield 27 from the bottom thereof, wherein the first and second engaging members 261, 271 are engaged with each other. Subsequently, the light emitting elements 25 are inserted into the slots 262 of the protection member 26 through the cavities 273 so that terminals 251 of the light emitting elements 25 project downward and connect to a circuit board 28 below the connector assembly 2, as shown in FIG. 2D. With the light emitting elements 25 and the protection member 26 encompassed by the shield 27, light scattering from the light emitting elements 25 is prevented. Lastly, the rear member 32 is joined with the front member 31 to conceal the light pipe 24, wherein the shield 27 contacts the rear member 32.

Figure 5:
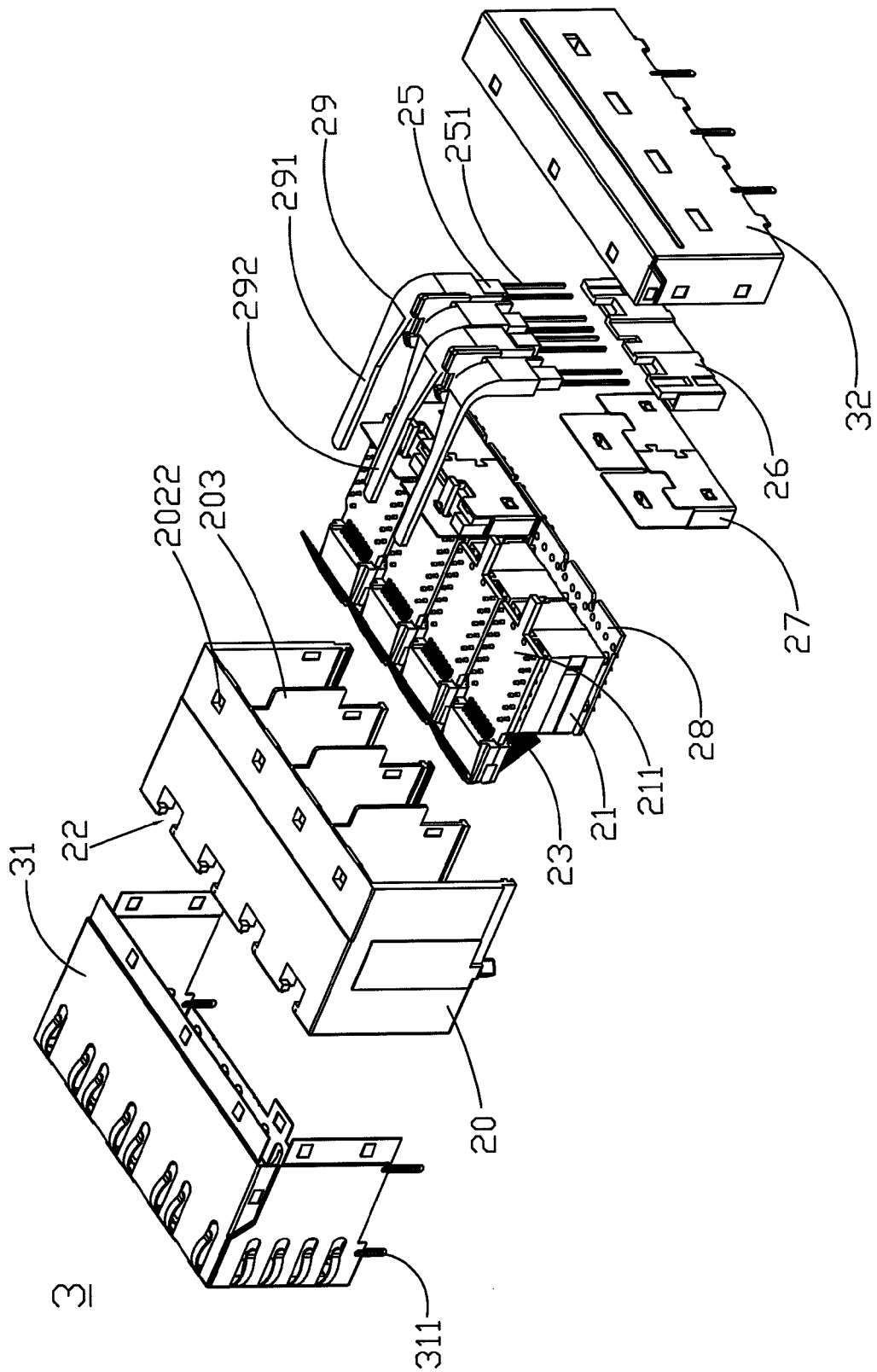
FIG. 5 is an exploded diagram of the another embodiment of a connector assembly according to the present invention.
Figure 6:
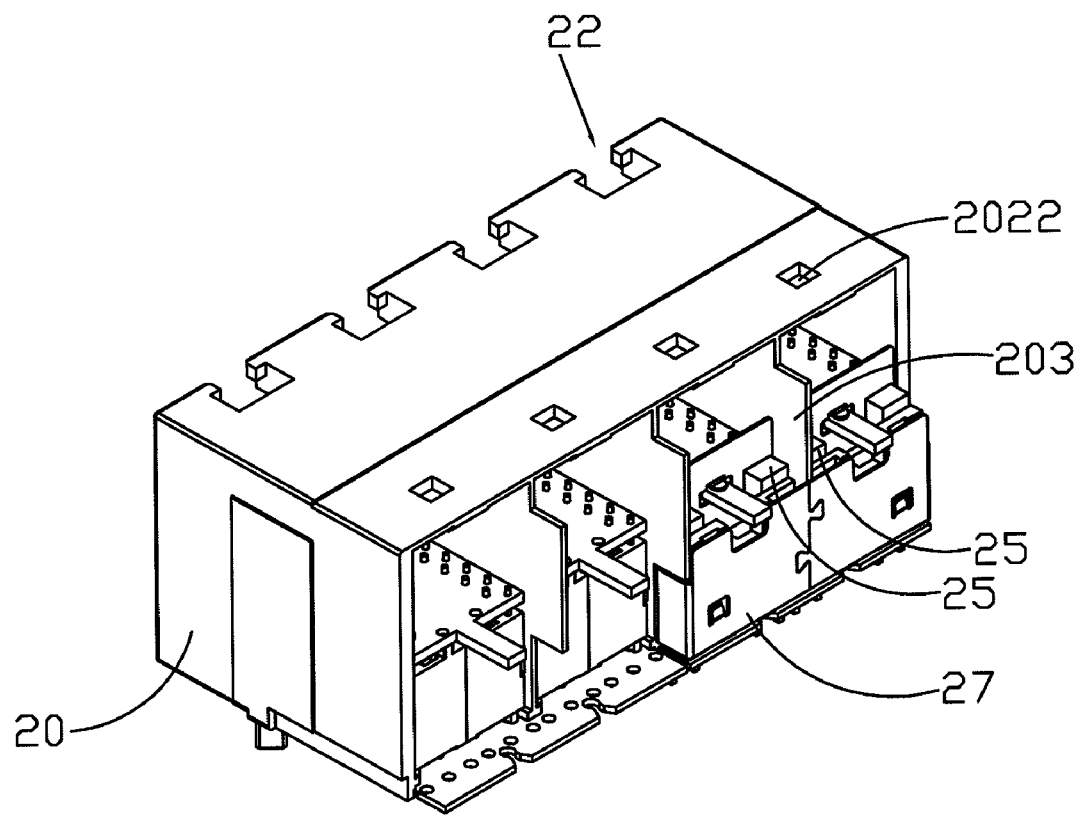
FIG. 6 is a perspective diagram of the connector assembly shown in FIG. 5 without the rear member and the light pipe pair.
Figure 7:
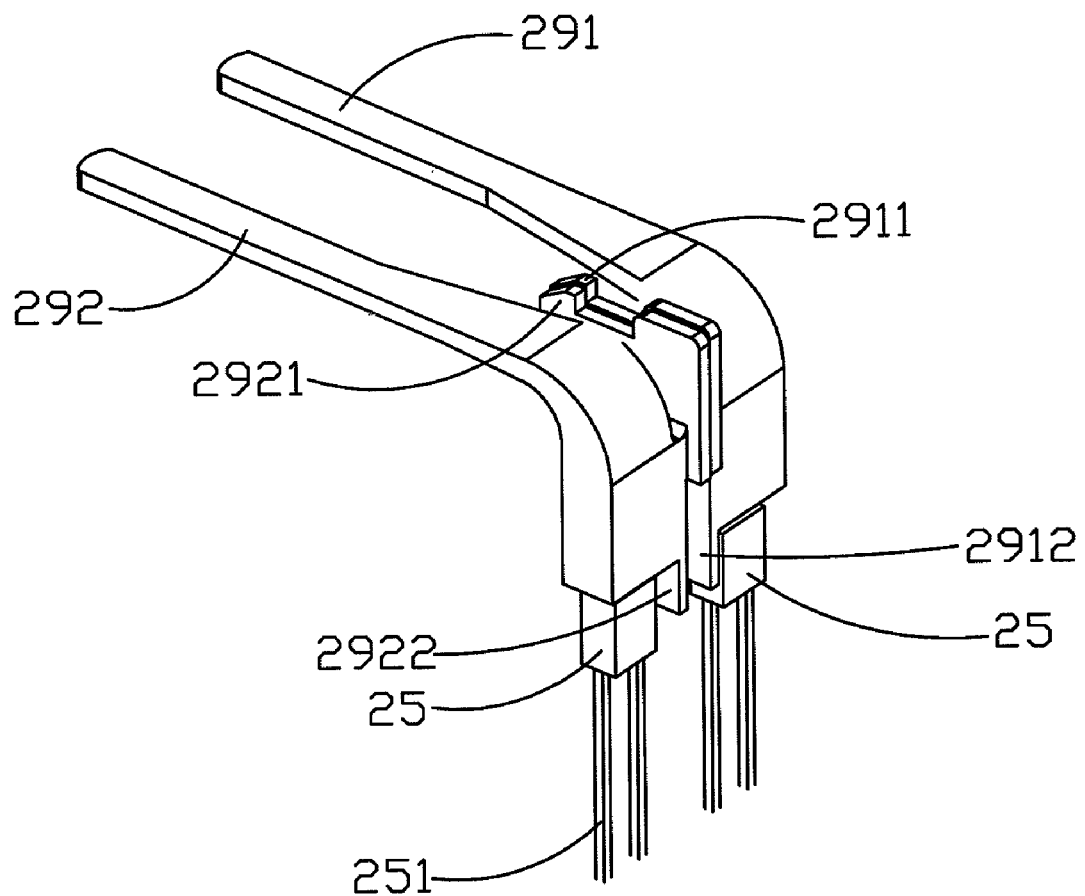
FIG. 7 is a perspective diagram of the light pipe pair and light emitting elements of the connector assembly shown in FIG. 5.

FIGS. 5-7 show another embodiment of a connector assembly 3 according to the present invention. As shown in FIG. 5, the connector assembly 3 includes a housing 20 formed in a monolithic piece and having a plurality of sockets 22 and a plurality of spacers 203 for dividing the sockets 22. An electronic device 21 is disposed in the housing 20 and includes a plurality of pins 23 received in a plurality of recesses of the housing 20, respectively. The electronic device 21 further includes a plurality of circuit boards 211 horizontally disposed in the housing 20. A light emitting element 25 is receiving in a protection member 26 and the light emitting element 25 and the protection member 26 are encompassed by a shield 27.

The connector assembly 3 further includes a light pipe pair 29. As shown in FIG. 5, the light pipe pair includes two light pipes symmetrically disposed each other. A plurality of channels 2021 are disposed at the upper surface of the housing 20 so that two extended portions 291 and 292 of the light pipe pair 29 can be inserted through the channels 2021 and exposed to the front side of the housing 20. The bottom of the light pipe pair 29 abuts the light emitting element 25 so that light from the light emitting element 25 is guided to a front side of the housing 20 for showing the operational state of the connector assembly 3.

FIG. 6 is a perspective diagram of the connector assembly 3 shown in FIG. 5 without the rear member 32 and the light pipe pair 29. The spacer 203 is disposed in two adjacent light emitting members 25 which belong two different sockets 22, respectively, so that the light leakage between the adjacent light emitting elements can be prevented.

FIG. 7 is a perspective diagram of the light pipe pair 29 and light emitting elements 25 of the connector assembly 3 shown in FIG. 5. Referring to FIGS. 5 to 7, the light pipe pair 29 includes two hooks 2911 and 2921 disposed between the two adjacent extended portions 291 and 292 and engaged with the corresponding hole 2022 of the housing 20 so that the light pipe pair 29 can be positioned and fixed to the housing 20. Two elongate parts 2912 and 2922 are disposed at the bottom of the light pipe pair 29 and extends between the light emitting elements 25 of the same socket 22 so that the light leakage between the two light emitting elements of the same socket 22 can be prevented.

As shown in FIG. 7, the light pipe pair includes two light pipes symmetrically formed each other. Light emitted from one light emitting element can be transmitted to the front side of the housing 20 without influence of light leakage from the adjacent light emitting elements. Similarly, two hooks 2911 and 2921 can be connected together so that the light pipe pair 29 can be regarded as a monolithic piece.

This invention provides a connector assembly comprising a rear member 32 for insulating noise. The rear member 32 not only conceals the light pipe 24, but also connects to the shield 27 and the front member 31, wherein disorder signals can be efficiently eliminated by grounding via the ground legs 311 of the front member 31, thus preventing EMI and improving reliability of signal transmissions.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:
1. A connector assembly comprising:
a housing having at least a socket and a plurality of spacers;
at least an electronic device disposed in the socket;
at least a protection member disposed on a side of the housing;
at least a light emitting element disposed on the protection member;
at least a light pipe pair coupled to the housing for guiding light from the light emitting element;
at least a shield surrounding the protection member and the light emitting element; and
a cover encompassing the light pipe pair, the shield, and the light emitting element';
wherein the spacer is disposed between two adjacent light emitting members so that the light leakage between the two adjacent light emitting members can be prevented.
2. The connector assembly as claimed in claim 1, wherein the electronic device comprises a circuit board horizontally disposed in the housing.
3. The connector assembly as claimed in claim 1, wherein the housing is formed as a monolithic piece.
4. The connector assembly as claimed in claim 3, wherein the housing is integrally formed by injection molding.
5. The connector assembly as claimed in claim 1, wherein the cover comprises a front member and a rear member, wherein the front member has a plurality of legs connected to ground, and the front and rear members are connected to each other by engaging, adhering or fastening.
6. The connector assembly as claimed in claim 1, wherein the housing comprises a plurality of recesses, and the electronic device comprises a plurality of pins received in the recesses so that an external plug can be electrically connected to the pins.
7. The connector assembly as claimed in claim 1, wherein the light pipe pair comprising two light pipes symmetrically formed each other.
8. The connector assembly as claimed in claim 7, wherein each of the light pipes comprises a hook and an extended portion.
9. The connector assembly as claimed in claim 8, wherein the two hooks are disposed between the two extended portions and engaged with a hole of the housing for positioning of the light pipe pair.
10. The connector assembly as claimed in claim 8, wherein the housing has a channel on a top inner surface thereof, and the extended portion is inserted through the channel and exposed to a front side of the housing.
11. The connector assembly as claimed in claim 7, wherein each of the light pipes comprises an elongate part disposed at the bottom of the light pipe.
12. The connector assembly as claimed in claim 11, wherein the elongate part extends between the light emitting elements for preventing the light leakage.
13. The connector assembly as claimed in claim 7, wherein the light pipe pair is formed as a monolithic piece.
14. The connector assembly as claimed in claim 1, wherein the protection member comprises a first engaging member, and the shield comprises a second engaging member engaged with the first engaging member.
15. The connector assembly as claimed in claim 1, wherein the shield comprises at least a partition for dividing the shield into a plurality of cavities with the light emitting element to be inserted therein.
16. The connector assembly as claimed in claim 1, further comprising a main circuit board disposed at the bottom of the housing, and the light emitting element comprises a plurality of terminals electrically connected to the main circuit board.
17. The connector assembly as claimed in claim 1, wherein the light pipe pair comprises plastic, glass or acrylics.
18. The connector assembly as claimed in claim 1, wherein the light emitting element is an LED.
19. The connector assembly as claimed in claim 1, wherein the connector assembly is an RJ-45 connector.

* * * * *